H. W. AVERY.
Carriage-Spring.

No. 225,093. Patented Mar. 2, 1880.

Witnesses: F. D. Thomason, J. B. Holderby

Inventor: Handy W. Avery
By Rob't & A. P. Lacey, atty.

UNITED STATES PATENT OFFICE.

HANDY W. AVERY, OF BROOKFIELD, NEW YORK.

CARRIAGE-SPRING.

SPECIFICATION forming part of Letters Patent No. 225,093, dated March 2, 1880.

Application filed December 15, 1879.

*To all whom it may concern:*

Be it known that I, HANDY W. AVERY, of Brookfield, in the county of Madison and State of New York, have invented certain new and useful Improvements in Carriage - Springs; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has for its object to furnish a spring for vehicles which will have a vertical and lateral adjustment without using the ordinary couplings or hangers.

It consists in short head-blocks or cross-springs made of elastic rubber, which are firmly secured to, with their ends projecting beyond, central fixed and rigid supports, and in two metallic springs arranged on opposite sides of said supports, and having their ends secured to the projecting ends of the rubber head-blocks.

Figure 1:
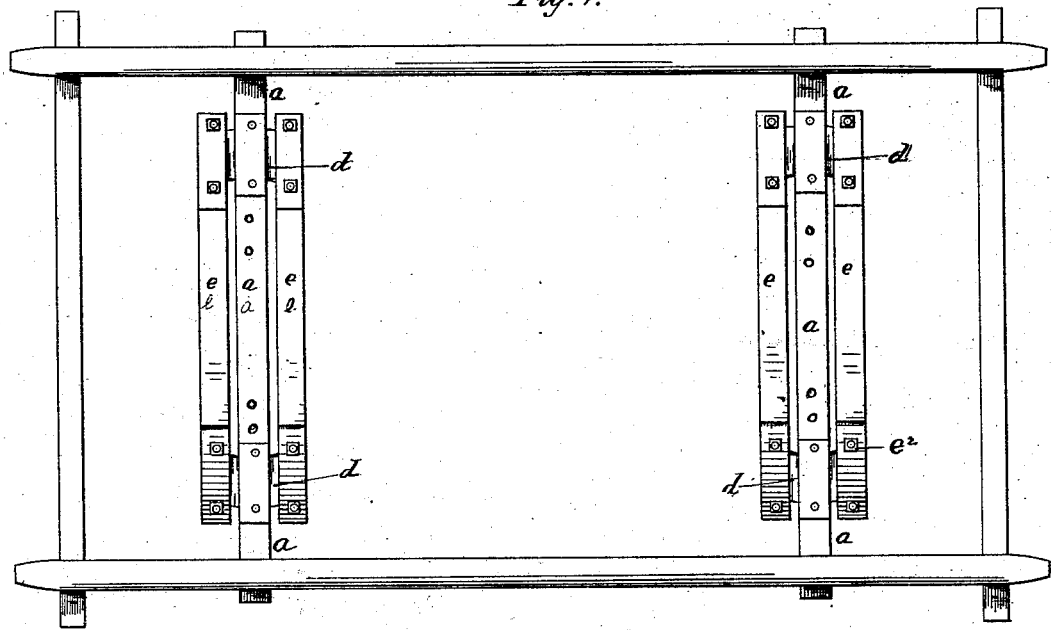
Figure 2:
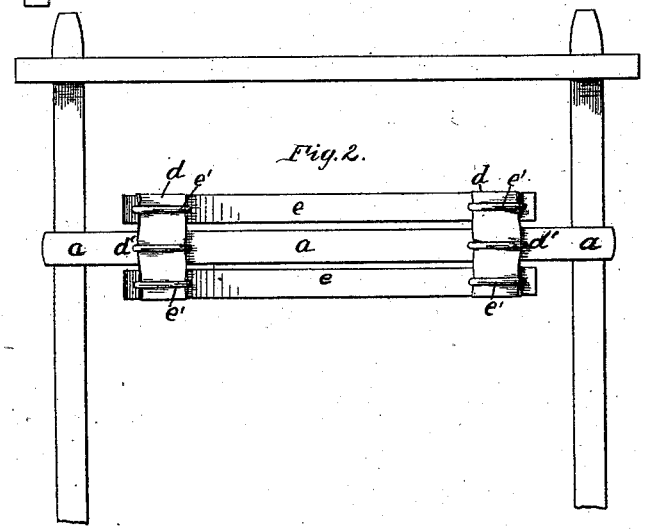
Figure 3:
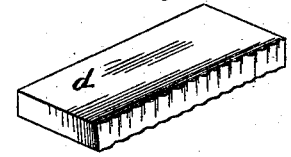
Figure 4:
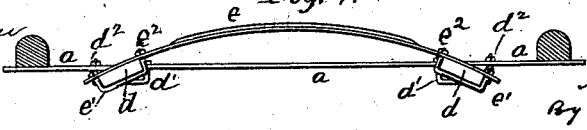

In the drawings, Figure 1 is a plan view of springs constructed according to my invention. Fig. 2 is a view of the under side of the same; Fig. 3, short elastic head-spring, and Fig. 4 is a side elevation of one of the springs held on its supports.

In the construction of springs it is necessary to provide for the extension of the ends of the leaves as the said spring is straightened by the weight placed upon it. This compensating mechanism has been provided in various ways, such as having the spring made in two parts—an upper and an under—having their ends fastened together by a bolt, or having the ends of the spring fastened to loops which are held to the frame of the vehicle, so that they swing laterally. Other methods have been employed, all following somewhat after the methods above indicated.

In my device I employ a short elastic rubber block, which is fastened to, with its ends projecting slightly beyond, the edges of a strong central bar. To the ends of the rubber block I attach the ends of the springs. The ends of the central supporting-bar are fixed to the frame-work of the vehicle in such manner as to support the springs in proper position under the body of the said vehicle.

$a$ is a central supporting-bar, made, by preference, to extend across the vehicle-frame and provide supports for both ends of the springs hereinafter described. Instead of having a long bar like this to extend across the vehicle, a separate support for each end of the spring can be fixed to the side bars or frame of the vehicle.

$d$ are the short elastic rubber head-blocks, laid across and are secured at their centers to the under side of the supporting-bar $a$ by single staples or loops $d'$. The ends of the blocks $d$ project beyond the edges of the bar or support $a$ a sufficient distance to provide the necessary length to which the ends of the metallic springs are attached. The elastic blocks are arranged at such distances apart as will adapt them to the length of the metallic springs employed.

$e\ e$ are the metallic springs, employed in pairs or sets of two, the springs of each pair or set being arranged on opposite sides of the central bar, $a$, or other central support. The ends of the springs composing each set or pair are secured to the projecting ends of the elastic blocks $d$, near to the edges of the support $a$, and are firmly held to said head-blocks by the staples or loops $e'$.

The body of the vehicle can be secured to the springs in any of the well-known methods.

In this device, when the metallic springs $e$ are pressed downward the elastic head-blocks at the same time yield downward and outward, thereby perfectly adapting themselves to the downward and extension movements of the said springs $e$. The elastic head-blocks yield readily to every change of position or direction of motion taken by the metallic springs.

The retaining loops or staples $d'$ and $e'$, by which the head-block $d$ is held to the bar $a$ and springs $e$, may be formed with threaded shanks and provided with nuts $d^2$ and $e^2$, respectively, so that they may be readily attached to or detached from the said bar or springs. The head-blocks $d$ may thus be readily removed when desired, and be replaced by new blocks when the old ones are worn or have from any cause become unserviceable.

By having a series of holes provided in the stiff bar *a* the head-blocks *d* may be moved inward in order to stiffen or give increased set to the springs *e'*; or they may be moved outward if it be desired to render the said springs more elastic; but whether they be moved inward or outward they still preserve their vertical and lateral adjustment to the movements of the springs *e*.

I prefer to employ for a support the bar *a*, extended across the vehicle-frame and between the two springs, as shown; but it will be clearly understood that this construction is not a necessity, for a separate support may be provided for each end, as hereinbefore indicated.

Having thus described my invention, what I claim, and desire to secure by Letters Patent, is—

In a vehicle-spring, the supports *a*, attached to the vehicle-frame, the elastic rubber head-blocks *d*, projecting laterally from opposite sides of the supports *a*, and the springs *e e*, arranged on opposite sides of the supports *a*, all secured together and arranged to operate substantially as set forth.

In testimony that I claim the foregoing I have hereunto set my hand and seal this 12th day of December, 1879.

HANDY W. AVERY. [L. S.]

Witnesses:
J. V. R. LIVERMORE,
JUDSON CRAWFORD.